March 14, 1967   R. V. BLACKHURST ET AL   3,309,058
BLADED ROTOR
Filed June 8, 1966
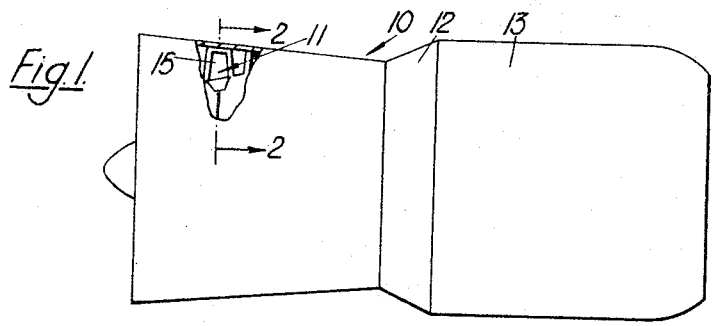
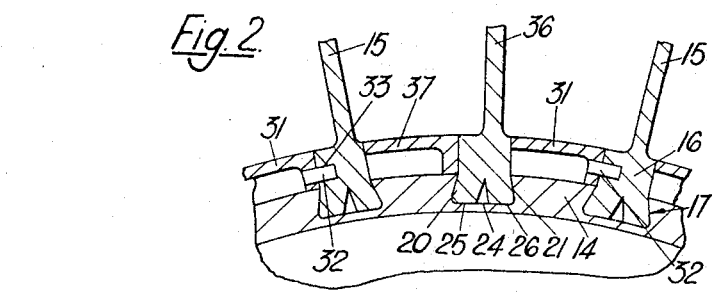
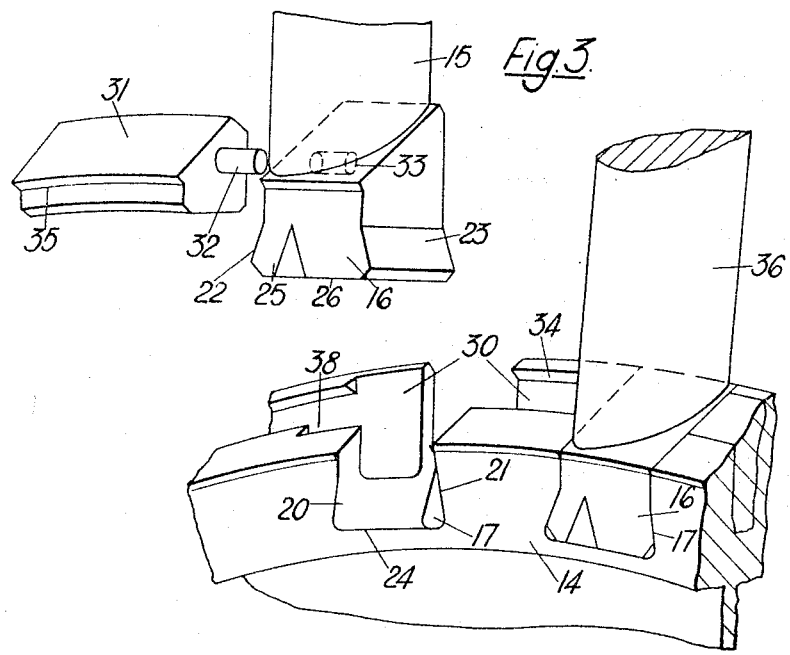
Inventors
Robert Vaughan Blackhurst
Harold James Harrison
By
Cushman, Darby & Cushman
Attorneys

United States Patent Office 3,309,058
Patented Mar. 14, 1967

3,309,058
BLADED ROTOR
Robert Vaughan Blackhurst, Ripley, and Harold James Harrison, Borrowash, England, assignors to Rolls-Royce Limited, Derby, England, a British company
Filed June 8, 1966, Ser. No. 556,212
Claims priority, application Great Britain, June 21, 1965, 26,208/65
8 Claims. (Cl. 253—77)

This invention concerns a bladed rotor.

According to the present invention, there is provided a rotor provided with a plurality of angularly spaced apart aerofoil-shaped blades each of which has a rotor portion which is located in a slot which extends radially inwardly from the periphery of the rotor, the rotor being provided with a peripheral annular groove which is intersected by the said slots, and in which are mounted and retained spacer members each of which extends between the root portions of adjacent blades, each slot having walls which slidably engage the respective root portion and which prevent both angular and radial movement of the respective blade with respect to the rotor, and each root portion having a recess therein which is located a projection which is mounted on an adjacent spacer member and which prevents movement of the respective blade axially of the rotor.

The groove preferably has walls which slidably engage the spacer members and which prevent radial and axial movement of the latter with respect to the rotor, each spacer member being prevented from moving circumferentially of the rotor by virtue of being engaged by the root portions of an adjacent pair of blades.

The width of each spacer member may be greater than that of each slot, the said walls of the groove being cut away in one region to permit each spacer member to be introduced into the groove.

The said walls of the groove may have dove-tail portions which prevent the spacer members being radially withdrawn from the groove.

Each slot preferably extends between axially opposite sides of the rotor, each slot and its respective root portion being of dove-tail shape.

The rotor may be provided with at least one further blade which does not form part of the said plurality of blades and whose root portion is not provided with a said recess, the or each said further blade being secured in a said slot. The root portion of the or each said further blade may be engaged by a spacer member which is mounted and retained in said groove but which is not provided with a said projection.

The rotor may, for example, be constituted by a rotor disc of a gas turbine engine compressor.

The invention also comprises a gas turbine engine (e.g. a vertical lift engine having a thrust to weight ratio of at least 8:1 and preferably of at least 12:1) provided with a rotor as set forth above.

The term "vertical lift engine" as used in this specification is intended to indicate an engine adapted to produce vertical lift forces on an aircraft independently of those generated aerodynamically by forward flight of the aircraft.

The invention is illustrated, merely by way of example, in the accompanying drawings, in which:

FIGURE 1 is a diagrammatic view of a gas turbine engine, partly in section, provided with a rotor according to the present invention, FIGURE 2 is a broken-away section taken on the line 2—2 of FIGURE 1, and FIGURE 3 is an exploded perspective view of the structure shown in FIGURE 2.

Referring to the drawings, a gas turbine vertical lift engine 10, having a thrust to weight ratio of at least 16:1, comprises flow series a compressor 11, combustion equipment 12 and a turbine 13. The compressor 11 is fabricated largely of synthetic resin materials.

The compressor 11 comprises a plurality of axially spaced apart rotor discs 14 (FIGURES 2 and 3) each of which is provided with a plurality of angularly spaced apart, aerofoil-shaped synthetic resin blades 15.

Each of the blades 15 has a root portion 16 which is located in a slot 17, each slot 17 extending radially inwardly from the periphery of the respective rotor disc 14.

Each of the slots 17 has side walls 20, 21 which slidably engage side walls 22, 23 respectively on the root portion 16 of the respective blade 15. Each slot 17 also has a radially inner wall or base 24 which slidably engages surfaces 25, 26 on the root portion 16 of the respective blade 15.

Each of the slots 17 extends between axially opposite sides of its rotor disc 14, each slot 17 and its respective root portion 16 being of dove-tail shape. Thus, as will be appreciated, the walls 20, 21, 24 of each slot 17, which slidably engage the respective root portion 16, prevent both angular and radial movement of the respective blade 15 with respect to the rotor disc 14.

Each of the rotor discs 14 is provided with a peripheral annular groove 30 which is intersected by the slots 17, the slots 17 having a greater radial depth than the groove 30. Mounted and retained in the groove 30 are a plurality of synthetic resin spacer members 31 each of which is provided with a metal pin or other projection 32. The width of each of the spacer members 31 is greater than that of each of the slots 17.

The root portion 16 of each of the blades 15 has a recess 33 therein in which the respective pin 32 is located, the said pin preventing movement of the respective blade 15 axially of its rotor disc 14.

The groove 30 has dove-tail shaped walls 34 which slidably engage dove-tail shaped walls 35 on the spacer members 31 and which prevent radial and axial movement of the latter with respect to the rotor discs 14. The walls 34 are cut away at one region 38 adjacent to a slot 17 to permit each spacer member 31 to be introduced radially into the said adjacent slot 17 and region 38, and so into the groove 30. The walls 34, 35 prevent the spacer members 31 from being gradually withdrawn from the groove 30. Each spacer member 31 is prevented from moving circumferentially of its rotor disc 14 by virtue of being disposed between and engaged by the root portions 16 of an adjacent pair of blades 15.

Each rotor disc 14, in addition to being provided with the blades 15, is also provided with a synthetic resin blade 36 which has exactly the same shape as the blade 15 except that it is not provided with a recess 33. The blade 36 of each rotor disc 14 is secured in a slot 17, for example by being cemented therein, e.g. by means of an adhesive or by resin bonding.

Alternatively, the blade 36 may be secured in the slot 17 by means of a lock-plate having tabs (not shown), or by means of a spring loaded pin or other device (not shown), or by means of a leaf spring (not shown).

The root portion 16 of the blade 36 is engaged by a spacer member 37 which is mounted and retained in the groove 30 but which is not provided with a pin 32.

The blades 15, 36 may be mounted in position in the respective rotor disc 14 by first introducing a blade 15 into the slot 17 which is adjacent to but spaced anti-clockwise from the slot 17 which communicates with the cut-away region 38. A spacer member 31 is then introduced into the groove 30 via the cut-away region 38 and the slot 17 communicating therewith and is moved in a clockwise direction through the groove 30 until its pin 32 enters the respective recess 33 in the root portion of the blade 15. A second blade 15 is then inserted into the slot 17 adjacent to but spaced anti-clockwise from the slot 17 containing the first blade 15, and another spacer member 31 is then introduced into the groove 30 via the cutaway region 38 and the slot 17 communicating therewith, and is moved in a clockwise direction through the groove 30 until its pin 32 enters the respective recess 33 in the root portion of the second blade 15. This process is repeated until all the blades 15 and spacer members 31 have been assembled. The spacer member 37 is then introduced into the last slot 17 and into the cut-away region 38, and is moved anti-clockwise into the groove 30 until it clears the last slot 17. The root portion 16 of the blade 36 is then introduced into position in this last slot 17 and is cemented or otherwise fixed in position therein.

If desired, the blades 15, 36 and the spacer members 31, 37 could be made entirely of metal and, if this were so, the respective rotor discs could be those of the turbine 13.

We claim:

1. A rotor comprising a rotor disc having a peripheral annular groove and a plurality of angularly spaced apart slots which intersect said groove and each of which extends radially inwardly from the periphery of the rotor disc; a plurality of angularly spaced apart aerofoil-shaped blades each of which has a root portion which is located in one of said slots, each of said slots having walls which slidably engage the respective root portion and which prevent both angular and radial movement of the respective blade with respect to the rotor disc; a plurality of spacer members each of which is mounted and retained in said groove and extends between the root portions of adjacent blades, the groove having walls which slidably engage the spacer members and which prevent radial and axial movement of the latter with respect to the rotor disc, each spacer member being prevented from moving circumferentially of the rotor disc by being engaged by the root portions of an adjacent pair of blades; and a projection on each spacer member, each root portion having a recess therein in which is located a said projection which prevents movement of the respective blade axially of the rotor disc.

2. A rotor as claimed in claim 1 in which the width of each spacer member is greater than that of each slot in said rotor disc, the said walls of the groove in said rotor disc being cut away in one region to permit each spacer member to be introduced into the groove.

3. A rotor as claimed in claim 1 in which the said walls of the groove in said rotor disc have dove-tail portions which prevent the spacer members being radially withdrawn from the groove.

4. A rotor as claimed in claim 1 in which each slot extends between axially opposite sides of the rotor disc, each slot and its respective root portion being of dove-tail shape.

5. A rotor as claimed in claim 1 in which the rotor is provided with at least one further blade other than the blades forming said plurality of blades, said further blade having a root portion without a recess therein, and separate means for securing said further blade in one of said slots of said rotor disc.

6. A rotor as claimed in claim 5 in which said means for securing said further blade in its slots includes a spacer member mounted and retained in said groove and engaging the root portion of said further blade.

7. A rotor disc as claimed in claim 6 in which said means for securing said further blade in its slot also includes cementing the root portion of said further blade in its slot.

8. A rotor as claimed in claim 5 in which said means for securing said further blade in its slot includes cementing the root portion of said further blade in its slot.

References Cited by the Examiner

UNITED STATES PATENTS

| | | | |
|---|---|---|---|
| 2,751,189 | 6/1956 | Ledwith | 253—77 |
| 2,843,356 | 7/1958 | Hull | 253—77 |
| 2,949,278 | 8/1960 | McCormick | 253—77 |
| 2,994,507 | 8/1961 | Keller et al. | 253—77 |
| 3,219,263 | 11/1965 | Davies et al. | 253—77 |

FOREIGN PATENTS 317,345  12/1956  Switzerland.

MARTIN P. SCHWADRON, *Primary Examiner.*

EVERETTE A. POWELL, Jr., *Examiner.*